United States Patent
Takizawa et al.

(10) Patent No.: US 9,935,471 B2
(45) Date of Patent: Apr. 3, 2018

(54) DRIVE APPARATUS AND TRANSPORTER

(71) Applicant: HONDA MOTOR CO., LTD., Tokyo (JP)

(72) Inventors: Daijiro Takizawa, Wako (JP); Yoshihiro Ito, Wako (JP); Hirokazu Oguma, Wako (JP); Masahiro Shimada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/239,836

(22) Filed: Aug. 18, 2016

(65) Prior Publication Data

US 2017/0054401 A1  Feb. 23, 2017

(30) Foreign Application Priority Data

Aug. 19, 2015  (JP) .................................. 2015-162170

(51) Int. Cl.
| | |
|---|---|
| *H02P 27/06* | (2006.01) |
| *H02J 7/00* | (2006.01) |
| *B60L 11/18* | (2006.01) |
| *B60L 11/00* | (2006.01) |

(52) U.S. Cl.
CPC .......... *H02J 7/0013* (2013.01); *H02J 7/0065* (2013.01); *B60L 11/002* (2013.01); *B60L 11/1864* (2013.01)

(58) Field of Classification Search
CPC ....................................................... H02P 27/06
USPC .................................................... 318/139, 34
See application file for complete search history.

(56) References Cited

U.S. PATENT DOCUMENTS

| | | | | |
|---|---|---|---|---|
| 6,476,571 | B1 * | 11/2002 | Sasaki ...................... | B60K 6/26 180/65.1 |
| 7,133,602 | B2 * | 11/2006 | Yamada .............. | B60L 11/1861 318/375 |
| 7,332,881 | B2 * | 2/2008 | Clark ...................... | B60L 3/108 318/139 |

FOREIGN PATENT DOCUMENTS

JP  2014-143817  8/2014

* cited by examiner

*Primary Examiner* — David S Luo
(74) *Attorney, Agent, or Firm* — Mori & Ward, LLP (57) ABSTRACT

A drive apparatus includes a first power storage, a second power storage, an electric motor, a voltage booster, an electric device. The second power storage is superior to the first power storage in energy to weight density and is inferior to the first power storage in output to weight density. The electric motor is to be driven with power supplied from at least one of the first power storage and the second power storage. The voltage booster is to boost a voltage output from the first power storage. The voltage booster includes a switch to electrically connect or disconnect the first power storage to at least one of the electric motor and the second power storage. The electric device is provided between the first power storage and the voltage booster. The voltage output from the second power storage is higher than a guaranteed operating voltage of the electric device.

21 Claims, 10 Drawing Sheets

DRIVE APPARATUS AND TRANSPORTER

CROSS REFERENCE TO RELATED APPLICATIONS

The present application claims priority under 35 U.S.C. § 119 to Japanese Patent Application No. 2015-162170, filed Aug. 19, 2015, entitled "Drive Apparatus and Transporter." The contents of this application are incorporated herein by reference in their entirety.

BACKGROUND

1. Field

The present disclosure relates to a drive apparatus and a transporter.

2. Description of the Related Art

Figure 9:
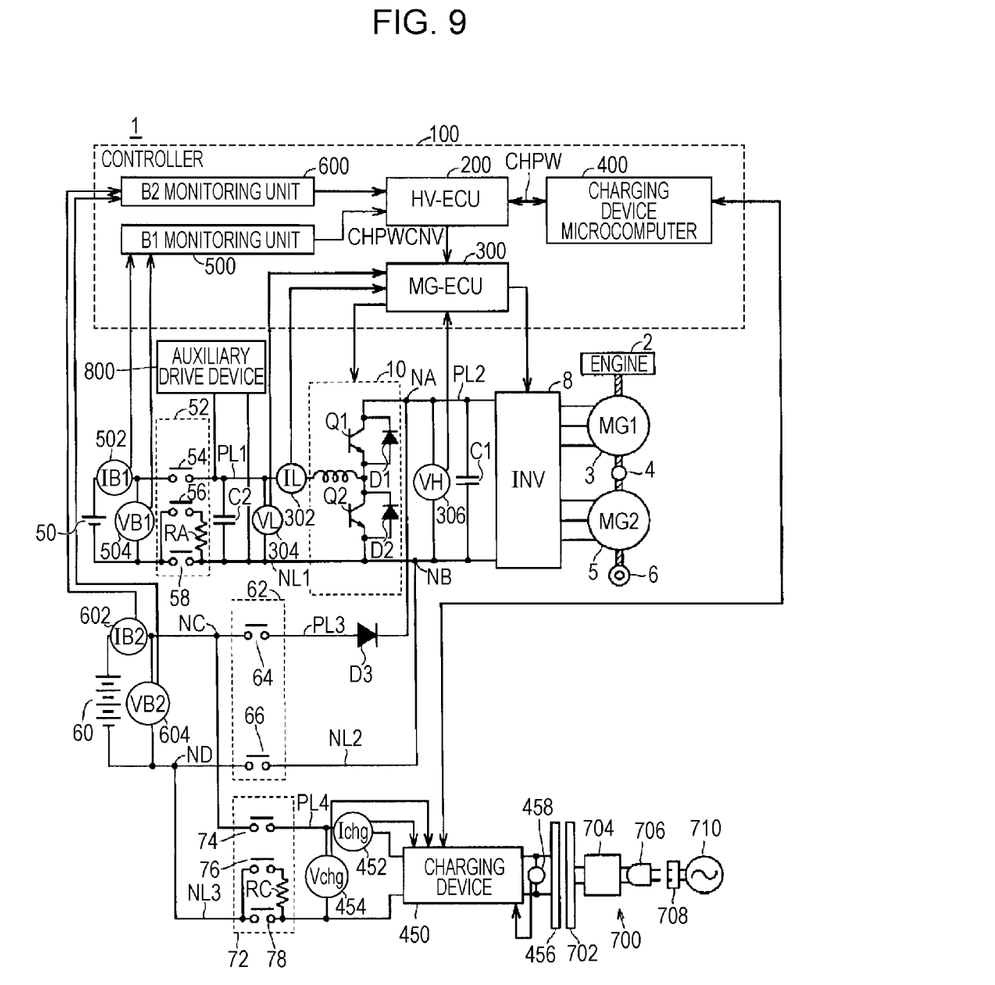
FIG. 9 is diagram illustrating a power supply system for a vehicle described in Japanese Unexamined Patent Application Publication No. 2014-143817.

FIG. 9 is a diagram illustrating a power supply system for a vehicle as described in Japanese Unexamined Patent Application Publication No. 2014-143817. The power supply system for a vehicle described in Japanese Unexamined Patent Application Publication No. 2014-143817 includes a first battery, a second battery having a larger capacity and higher internal resistance than the first battery, a charging device that receives power from outside the vehicle and charges the second battery, an auxiliary drive device that employs power from the first battery, a converter configured so as to be capable of supplying the first battery with part of the power the charging device is using to charge the second battery, and a controller that controls the charging device and the converter such that the charging state of the first battery is maintained at a target value when the auxiliary drive device is operated while the second battery is being charged by the charging device. The first battery is preferably a high output battery having a higher output density than that of the second battery, and the second battery is preferably a high capacity battery having a higher capacity density than the first battery. The voltage of the second battery is preferably higher than the voltage of the first battery. The power supply system further includes a diode to suppress supply of electrical power from the side of the converter, or an electrical load (an inverter and second MG), to the second battery.

SUMMARY

According to one aspect of the present invention, a drive apparatus includes a first power storage unit, a second power storage unit that is superior to the first power storage unit in energy to weight density, and inferior to the first power storage unit in output-to-weight density, a voltage step-up section that steps up an output voltage of the first power storage unit, an electric motor that is driven by power obtained from at least one out of the first power storage unit and the second power storage unit, and an electrical unit that is connected between the first power storage unit and the voltage step-up section. The voltage step-up section includes a switching element that opens or closes a current path between the first power storage unit, and either the electric motor or the second power storage unit, and a voltage of the second power storage unit is higher than a guaranteed operating voltage of the electrical unit.

According to another aspect of the present invention, a drive apparatus includes a first power storage, a second power storage, an electric motor, a voltage booster, an electric device. The second power storage is superior to the first power storage in energy to weight density and is inferior to the first power storage in output to weight density. The electric motor is to be driven with power supplied from at least one of the first power storage and the second power storage. The voltage booster is to boost a voltage output from the first power storage. The voltage booster includes a switch to electrically connect or disconnect the first power storage to at least one of the electric motor and the second power storage. The electric device is provided between the first power storage and the voltage booster. The voltage output from the second power storage is higher than a guaranteed operating voltage of the electric device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Explanation follows regarding an embodiment of the present application, with reference to the drawings.

Figure 1:
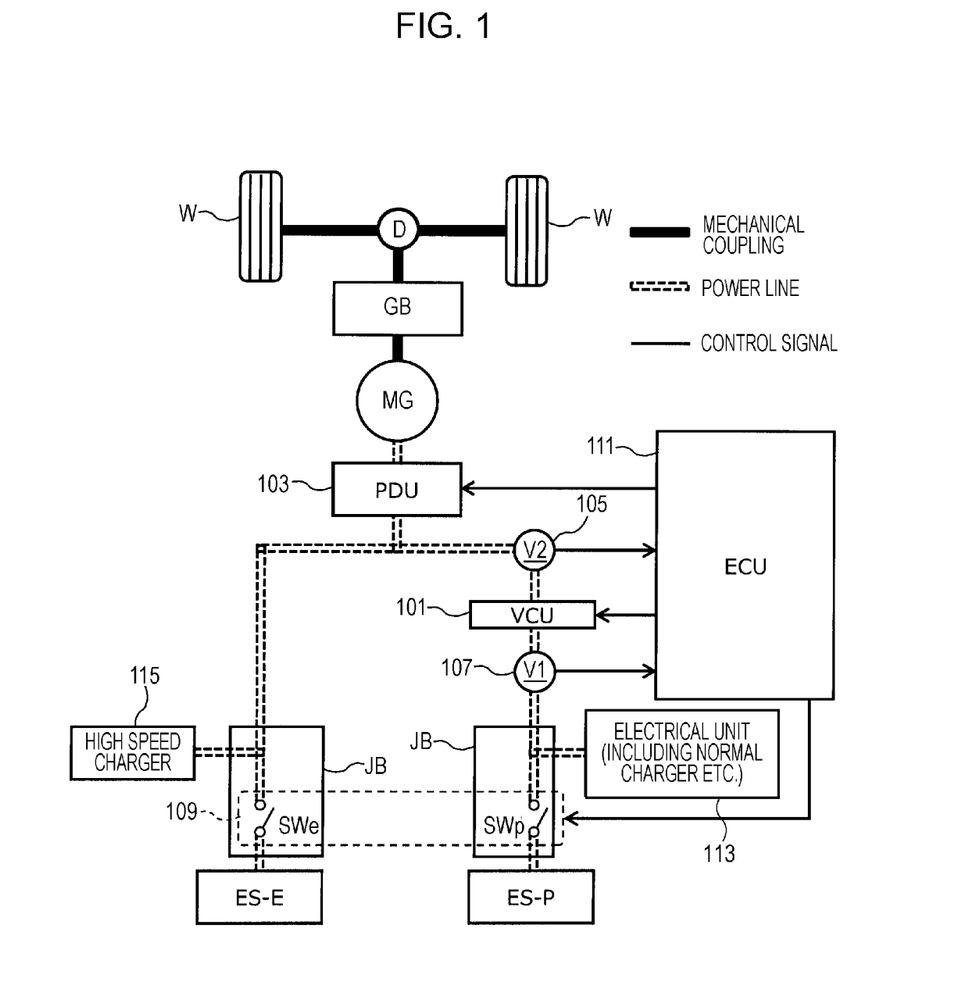
FIG. 1 is a block diagram illustrating an internal configuration of an electrically powered vehicle.

FIG. 1 is a block diagram illustrating an internal configuration of an electrically powered vehicle. The single motor electrically powered vehicle illustrated in FIG. 1 includes a motor generator MG, a high capacity battery ES-E, a high output battery ES-P, a voltage control unit (VCU) 101, a power drive unit (PDU) 103, a V2 sensor 105, a V1 sensor 107, a switch group 109, an ECU 111, an electrical unit (an electric device) 113, and a high speed charger 115. The bold solid lines in FIG. 1 indicate mechanical coupling, the double broken lines indicates power lines, and the thin solid lines indicate control signals.

The motor generator MG is driven by power obtained from at least one from out of the high capacity battery ES-E or the high output battery ES-P, and generates motive power to drive the electrically powered vehicle. The torque generated by the motor generator MG is transmitted to drive wheels W through a gear box GB including a variable transmission or a fixed transmission, and through a speed reduction mechanism D. The motor generator MG operates as a power generator during deceleration of the electrically powered vehicle, so as to output the braking power of the electrically powered vehicle. The recovered power generated by the motor generator MG operating as a power generator is accumulated in either the high capacity battery ES-E or the high output battery ES-P.

The high capacity battery ES-E includes plural storage cells, such as lithium ion batteries or nickel hydrogen batteries, and supplies high voltage electrical power to the motor generator MG. The high output battery ES-P also includes plural storage cells, such as lithium ion batteries or nickel hydrogen batteries, and supplies high voltage electrical power to the motor generator MG through the VCU 101 (a voltage booster). The high output battery ES-P is connected through the VCU 101 to the PDU 103, in parallel to the high capacity battery ES-E. The voltage of the high output battery ES-P is lower than the voltage of the high capacity battery ES-E. Thus, the power of the high output battery ES-P is stepped up by the VCU 101 to a voltage of the same level as that of the high capacity battery ES-E, and then supplied to the motor generator MG through the PDU 103.

The high capacity battery ES-E and the high output battery ES-P are not limited to being a secondary battery, such as the nickel hydrogen batteries or the lithium ion batteries mentioned above, and a fuel cell battery or air battery requiring supply of active substances from outside the battery itself. For example, a high output battery ES-P may be employed that includes a condenser capable of charging or discharging a large quantity of power over a short period of time, even though it has a small storage capacity.

The characteristics of the high capacity battery ES-E and the characteristics of the high output battery ES-P are different from each other. The high capacity battery ES-E has a lower output to weight density, but a higher energy to weight density, than the high output battery ES-P. The high output battery ES-P has a lower energy to weight density, but a higher output to weight density, than the high capacity battery ES-E. Accordingly, the high capacity battery ES-E is relatively superior from the perspective of energy to weight density, and the high output battery ES-P is relatively superior from the perspective of output to weight density. The energy to weight density is the quantity of power per unit weight (Wh/kg), and the output to weight density is the power output per unit weight (W/kg). The high capacity battery ES-E having superior energy to weight density is accordingly a power storage unit (a power storage) for the main purpose of providing high capacity, and the high output battery ES-P having superior output to weight density is accordingly a power storage unit (a power storage) for the main purpose of providing high output.

Such differences between the characteristics of the high capacity battery ES-E and the high output battery ES-P are caused, for example, by various parameters determined by the structure and materials etc. of elements configuring the battery, such as the electrodes, active substances, and electrolyte chambers. For example, the storage capacity, this being a parameter indicating the total amount of chargeable and dischargeable electricity, of the high capacity battery ES-E is superior to that of the high output battery ES-P. However, a rate characteristic, this being a parameter indicating the resistance to deterioration from charging and discharging, and the internal resistance (impedance), this being a parameter indicating the electrical resistance to charging and discharging, of the high output battery ES-P are superior to those of the high capacity battery ES-E.

Figure 2:
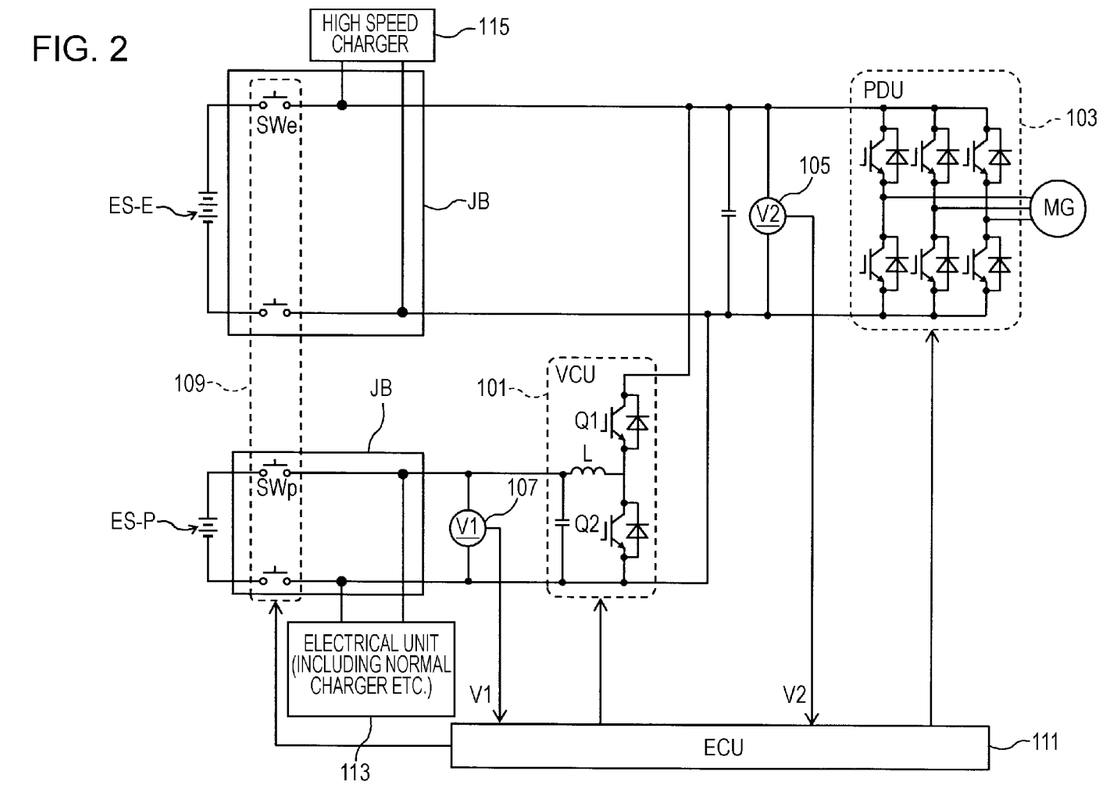
FIG. 2 is an electrical circuit diagram illustrating relationships between a high capacity battery, a high output battery, a VCU, a PDU, a motor generator, an electrical unit, and a high speed charger.

The VCU 101 steps up the output voltage of the high output battery ES-P as a direct current. The VCU 101 steps down the voltage of power that has been generated by the motor generator MG during deceleration of the electrically powered vehicle and converted into direct current. The VCU 101 also steps down the voltage of the power output by the high capacity battery ES-E. The power that has been stepped down in voltage by the VCU 101 charges the high output battery ES-P. FIG. 2 is an electrical circuit diagram illustrating relationships between the high capacity battery ES-E, the high output battery ES-P, the VCU 101, the PDU 103, and the motor generator MG. As illustrated in FIG. 2, VCU 101 employs a voltage V1 of the high output battery ES-P as an input voltage, and steps up the voltage V1 to the same level as a voltage V2 of the high capacity battery ES-E by ON-OFF switching of two switching elements Q1, Q2. Note that a V2 voltage level system of the high capacity battery ES-E and a V1 voltage level system of the high output battery ES-P can be isolated from each other by placing the switching element Q1 having its emitter connected to reactor line L in an OFF state without ON-OFF switching the two switching elements Q1, Q2.

The PDU 103 coverts direct current voltage into alternating current voltage, and supplies three phase current to the motor generator MG. The PDU 103 converts the alternating current voltage generated by the motor generator MG during deceleration of the electrically powered vehicle into direct current voltage.

The V2 sensor 105 detects the voltage V2 of the high capacity battery ES-E. The voltage V2 detected by the V2 sensor 105 is equivalent to a value of the voltage V1 of the high output battery ES-P stepped up in voltage by the VCU 101. The V2 sensor 105 sends a signal indicating the detected voltage V2 to the ECU 111. The V1 sensor 107 detects the voltage V1 of the high output battery ES-P. The V1 sensor 107 sends a signal indicating the detected voltage V1 to the ECU 111.

The switch group 109 includes a switch SWe that connects or interrupts a current path from the high capacity battery ES-E to the PDU 103, and a switch SWp that connects or interrupts a current path from the high output battery ES-P to the VCU 101, that are provided inside a junction box JB. Each of the switches SWe, SWp is switched ON or OFF by the ECU 111 according to a result of battery selection.

The ECU 111 controls the VCU 101 and the PDU 103, controls charging and discharging between the motor generator MG, and the high output battery ES-P and the high capacity battery ES-E, and also performs ON/OFF control of the switch group 109. Details regarding the ECU 111 are described later.

The electrical unit 113 is connected between the high output battery ES-P and the VCU 101 through the junction box JB provided between the high output battery ES-P and the VCU 101. The electrical unit 113 includes a normal charger that is connected in parallel to the high output battery ES-P and the VCU 101, a heater that raises the temperature of the high output battery ES-P, and a DC/DC converter for an air conditioner and low-voltage auxiliary equipment. The air conditioner is configured mainly from an electric compressor and a water heater. The normal charger converts alternating current power from an external supply source, such as a commercial power supply, into direct current power at the V1 voltage level of the high output battery ES-P. The heater is connected between the high output battery ES-P and the VCU 101, and so raises the temperature of the high output battery ES-P efficiently without operating the VCU 101.

The high speed charger 115 is connected in parallel to the high capacity battery ES-E through the junction box JB provided between the high capacity battery ES-E and the PDU 103. The high speed charger 115 converts alternating current power from an external supply source, such as a commercial power supply, into direct current power at the V2 voltage level of the high capacity battery ES-E. A heater may be provided, connected to the junction box JB, for raising the temperature of the high capacity battery ES-E in a similar manner to the high output battery ES-P.

According to the configuration of the electrically powered vehicle of the present embodiment as described above, the V2 voltage level system of the high capacity battery ES-E and the V1 voltage level system of the high output battery ES-P can be isolated from each other by placing the switching element Q1, from out of the switching elements Q1, Q2 that perform alternate switching when the VCU 101 operates to step up voltage, in an OFF state. Due to such isolating, for example, the V2 voltage of the high capacity battery ES-E is not applied to the electrical unit 113, and hence the V2 voltage of the high capacity battery ES-E can be set higher than the guaranteed operating voltage of the electrical unit 113. Namely, the V2 voltage of the high capacity battery ES-E and the guaranteed operating voltage of the electrical unit 113 can be set independently. Thus even when the number of storage cells in the high capacity battery ES-E is increased and the V2 voltage of the high capacity battery ES-E becomes higher, there is no need to exchange the electrical unit 113 for another electrical unit with a different guaranteed operating voltage. Since it is possible to exploit the advantages of a system provided with two batteries having different characteristics, various vehicles having different performance demands may be applied as the electrically powered vehicle of the present embodiment. Moreover, due to excessive voltage withstanding capability not being required by the electrical unit 113, the cost of the electrical unit 113 can be reduced, and a more compact and lighter weight electrical unit 113 achieved.

Moreover, due to the voltage arising from counter-electromotive force generated at the maximum revolutions of the motor generator MG not being applied to the electrical unit 113 due to the OFF state of the switching element Q1 of the VCU 101, the withstand voltage of the electrical unit 113 can be set lower than the voltage arising from counter-electromotive force generated at the maximum revolutions of the motor generator MG. Thus, due to being able to independently set the withstand voltage of the electrical unit 113 and the voltage arising from counter-electromotive force generated by the motor generator MG, the degrees of freedom are increased when selecting the motor generator MG at the design stage of the electrically powered vehicle. Moreover, due to excessive withstand voltage performance not being required by the electrical unit 113, the cost of the electrical unit 113 can be further reduced, and an even more compact and lighter weight electrical unit 113 achieved.

Next, explanation follows regarding charging control of the high capacity battery ES-E or the high output battery ES-P in the electrically powered vehicle of the present embodiment, with reference to FIG. 3 to FIG. 9.

Figure 3:
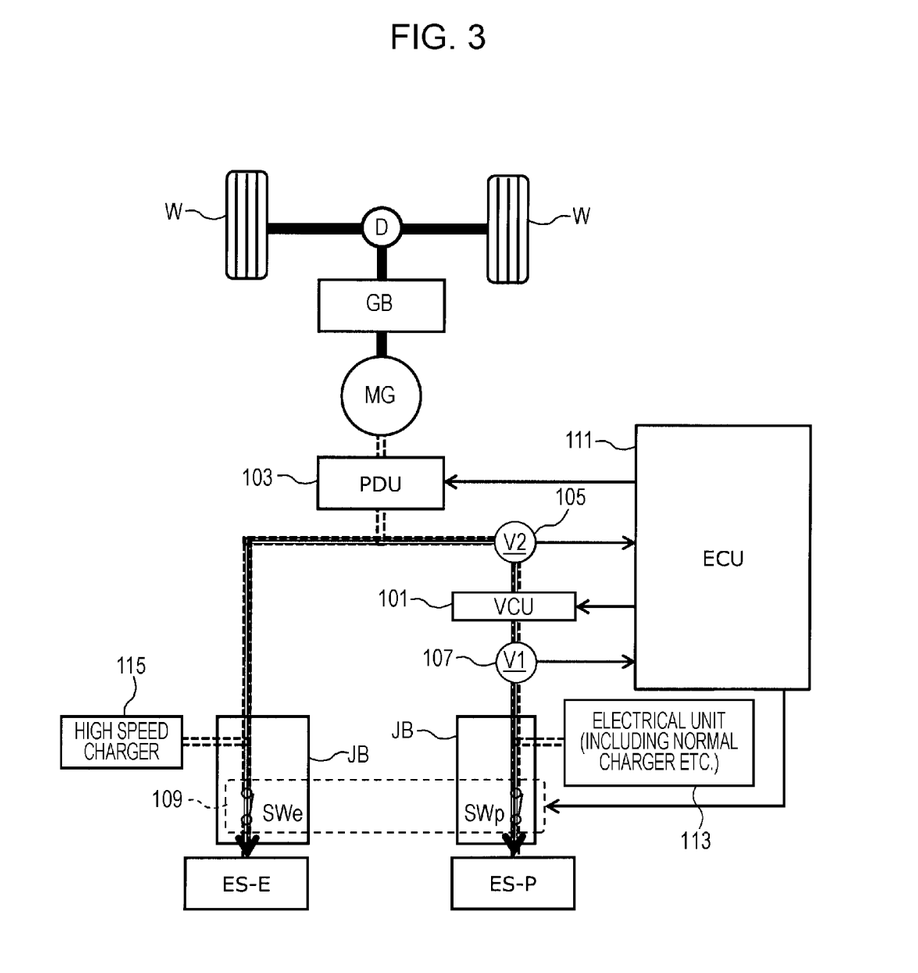
FIG. 3 is a diagram illustrating a flow of current during power interchange between a high capacity battery and a high output battery.

FIG. 3 is a diagram illustrating a flow of current when power is interchanged between the high capacity battery ES-E and the high output battery ES-P. As illustrated in FIG. 3, due to power being delivered and received through the VCU 101 when power from one battery is used to charge the other battery, the ECU 111 controls the VCU 101 so as to step up or step down the voltage obtained from the one battery with the switches SWe, SWp in the ON state, and does not operate the PDU 103. Such a charging mode enables the remaining capacity, i.e. the state of charge (SOC) of each of the batteries, to be adjusted.

In the power supply system described in Japanese Unexamined Patent Application Publication No. 2014-143817, power can be interchanged from the second battery 60 to the first battery 50. However, it is not possible for power to be interchanged from the first battery 50 to the second battery 60 due to the diode D3 being provided with its forward direction going from the second battery 60 toward the motor generators 3, 5. Thus, the system stability is greater than that of the power supply system described in the Japanese Unexamined Patent Application Publication No. 2014-143817 due to the electrically powered vehicle of the present embodiment being provided with abundant charging routes.

Figure 4:
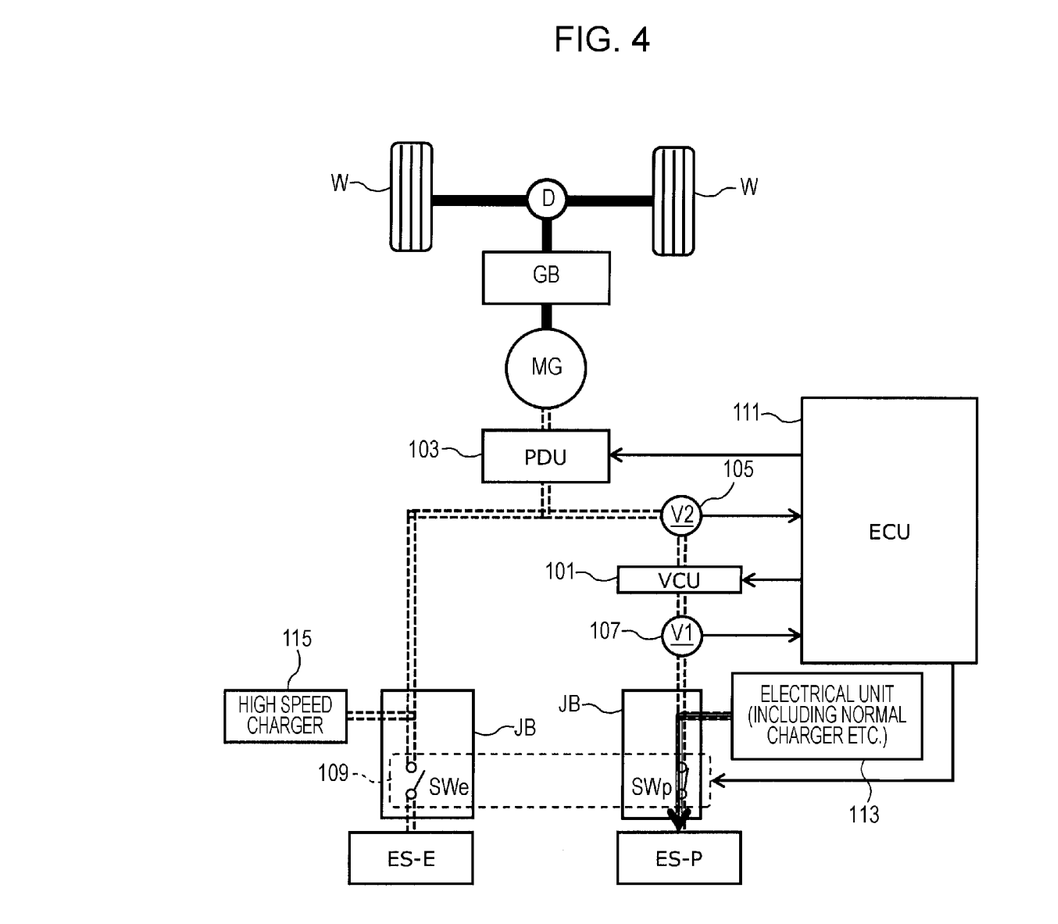
FIG. 4 is a diagram illustrating a flow of current during charging of a high output battery using a normal charger included in an electrical unit.

FIG. 4 is a diagram illustrating a flow of current during charging of the high output battery ES-P using the normal charger included in the electrical unit 113. As illustrated in FIG. 4, during charging of the high output battery ES-P using the normal charger included in the electrical unit 113, the ECU 111 places the switch SWe in the OFF state, the switch SWp in the ON state, and does not operate VCU 101 or the PDU 103. In this charging mode, the high output battery ES-P can be charged efficiently, without energy loss in the VCU 101.

Figure 5:
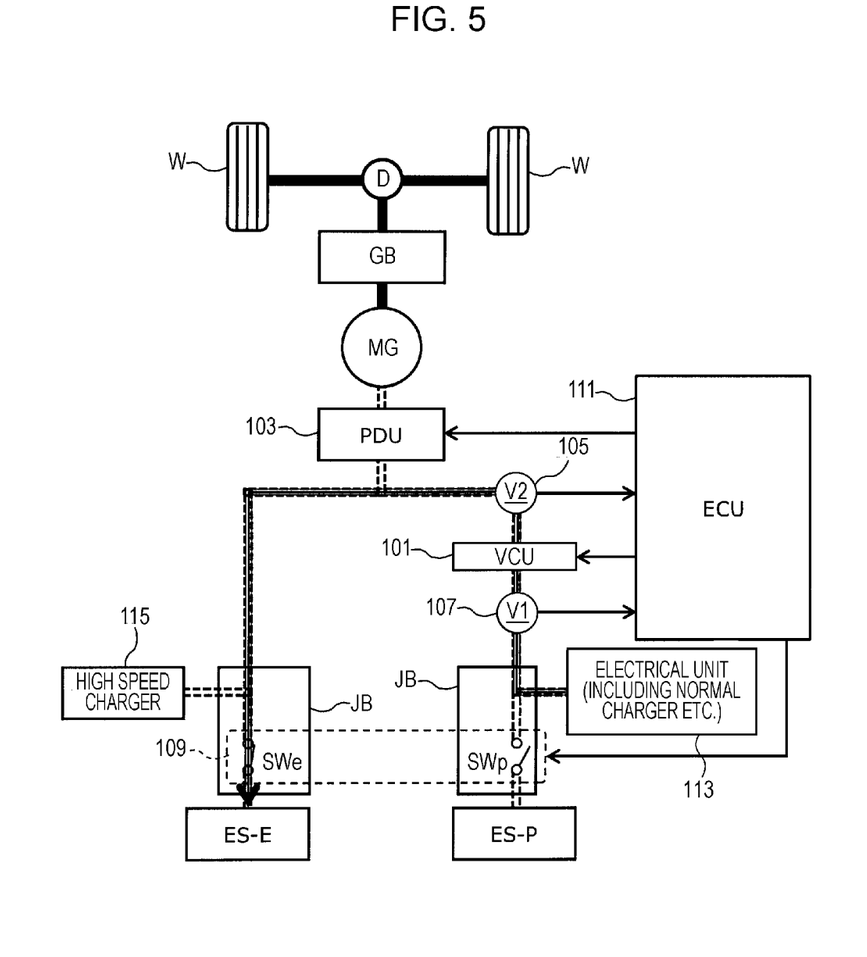
FIG. 5 is a diagram illustrating a flow of current during charging of a high capacity battery using a normal charger included in an electrical unit.

FIG. 5 is a diagram illustrating a flow of current during charging of the high capacity battery ES-E using the normal charger included in the electrical unit 113. As illustrated in FIG. 5, during charging of the high capacity battery ES-E using the normal charger included in the electrical unit 113, the ECU 111 places the switch SWe in the ON state, the switch SWp in the OFF state, controls the VCU 101 such that the voltage obtained from the normal charger is stepped up, and does not operate the PDU 103. In this charging mode, due to being able to charge the high capacity battery ES-E using the power obtained from the normal charger by passing through the VCU 101, the high capacity battery ES-E can also be charged by the normal charger.

Figure 6:
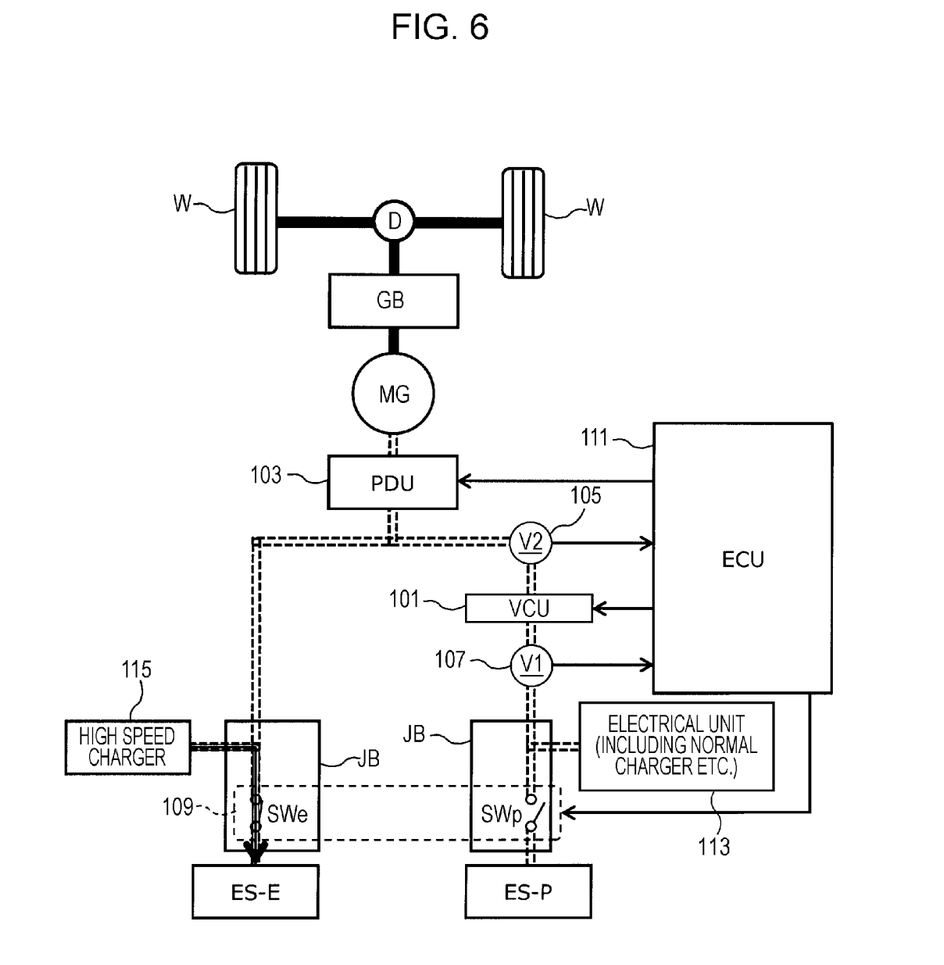
FIG. 6 is a diagram illustrating a flow of current during charging of a high capacity battery using a high speed charger.

FIG. 6 is a diagram illustrating a flow of current during charging of the high capacity battery ES-E using the high speed charger 115. The high speed charger 115, as is well known, charges with a higher voltage and larger current than a normal charger. As illustrated in FIG. 6, during charging of the high capacity battery ES-E using the high speed charger 115, the ECU 111 places the switch SWe in the ON state, the switch SWp in the OFF state, and does not operate the VCU 101 or the PDU 103. In this charging mode, due to being able to charge the high capacity battery ES-E using the power obtained from the high speed charger 115 corresponding to the V2 voltage of the high capacity battery ES-E, the high capacity battery ES-E can be efficiently charged.

Figure 10:
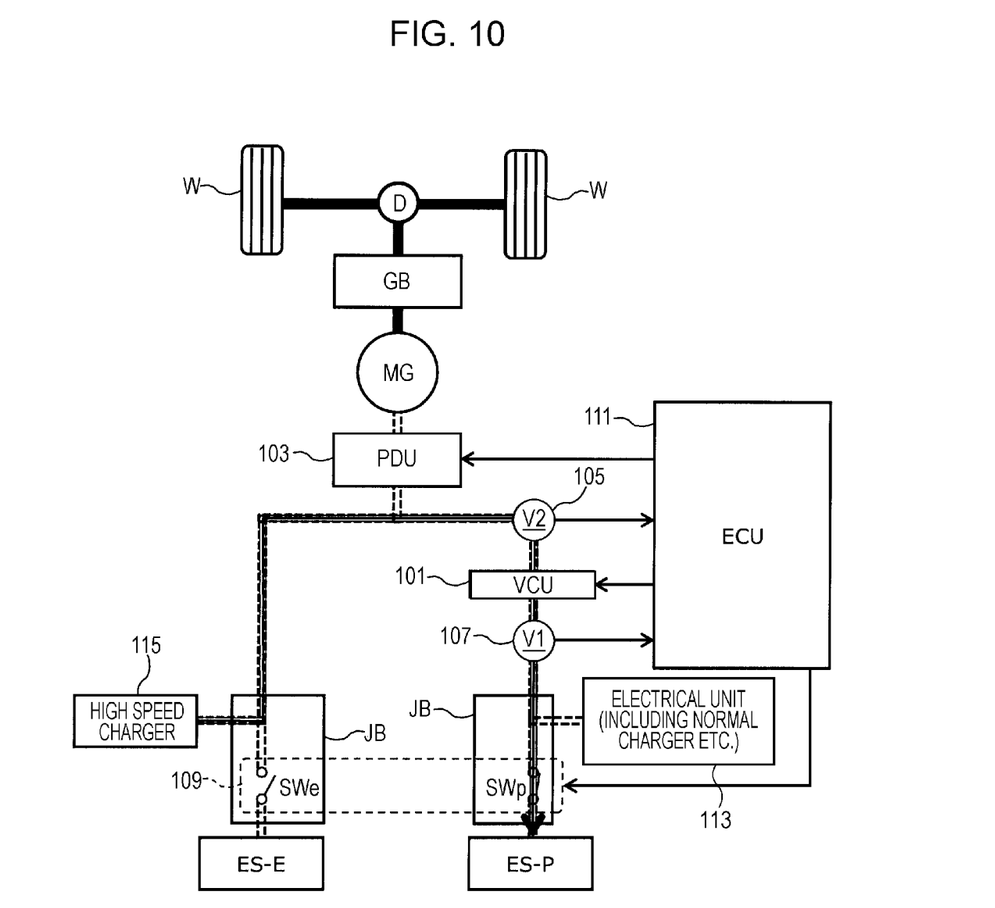
FIG. 10 is a diagram illustrating a flow of current during charging of a high output battery using a high speed charger.

FIG. 10 is a diagram illustrating a flow of current during charging of the high output battery ES-P using the high speed charger 115. The high speed charger 115, as is well known, charges with a higher voltage and larger current than a normal charger. As illustrated in FIG. 10, during charging of the high output battery ES-P using the high speed charger 115, the ECU 111 places the switch SWe in the OFF state, the switch SWp in the ON state, controls the VCU 101 so as to step down the voltage obtained from the high speed charger 115, and does not operate the PDU 103. In this charging mode, due to being able to charge the high output battery ES-P using the power obtained from the high speed charger 115 by passing through the VCU 101, the high output battery ES-P can also be charged by the high speed charger 115.

Note that in order to charge the high output battery ES-P using the high speed charger 115, the VCU 101 needs to be compatible with the higher voltage and larger current the high speed charger 115 outputs. A VCU 101 that is compatible with the higher voltage and larger current is a cause of increased cost and increased weight. Thus, in order to achieve reduction in the cost and weight of the system overall, the cost and the weight of the VCU 101 may be suppressed by not providing the charging route illustrated in FIG. 10. Namely, whether or not to employ the charging route illustrated in FIG. 10 may be selected at the design stage of the electrically powered vehicle.

Figure 7:
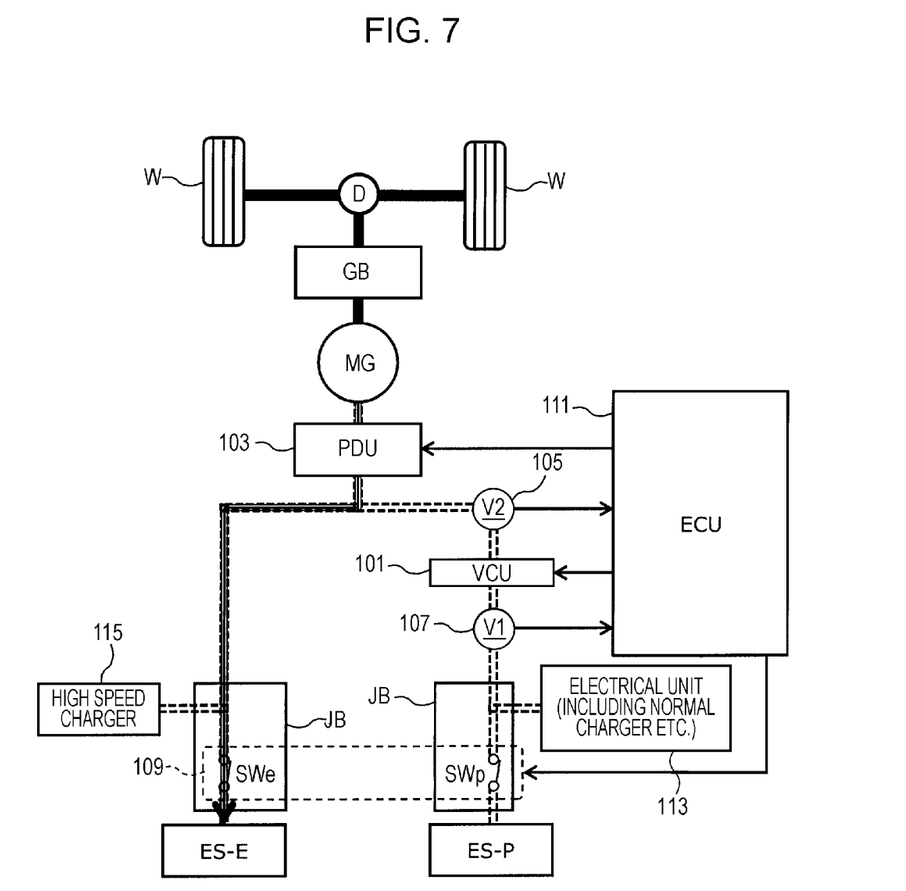
FIG. 7 is diagram illustrating a flow of current during charging of a high capacity battery using recovered power from a motor generator.

FIG. 7 is a diagram illustrating a flow of current during charging of the high capacity battery ES-E using recovered power from the motor generator MG. As illustrated in FIG. 7, during charging of the high capacity battery ES-E using recovered power generated by the motor generator MG, such as during deceleration of the electrically powered vehicle, the ECU 111 places the switch SWe in the ON state, the switch SWp in the ON state, controls the PDU 103 such that the alternating current voltage obtained from the motor generator MG is converted into a direct current voltage, and does not operate the VCU 101. In this charging mode, the high capacity battery ES-E can be charged efficiently, without energy loss in the VCU 101.

Note in the power supply system described in Japanese Unexamined Patent Application Publication No. 2014-143817, it is not possible to charge the first battery 50 using recovered power generated by the motor generators 3, 5 due to the diode D3 being provided with its forward direction going from the second battery 60 toward the motor generators 3, 5. Thus, system stability is greater than that of the power supply system described in the Japanese Unexamined Patent Application Publication No. 2014-143817 due to the electrically powered vehicle of the present embodiment being provided with abundant charging routes.

Figure 8:
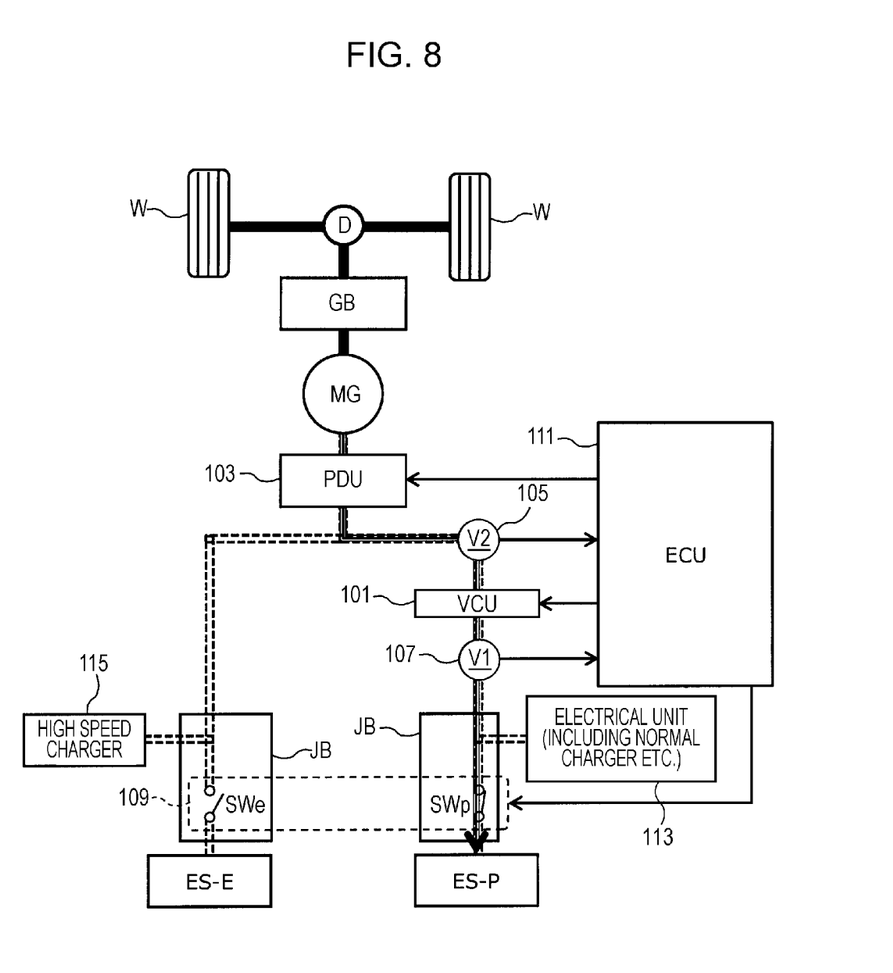
FIG. 8 is diagram illustrating a flow of current during charging of a high output battery using recovered power from a motor generator.

FIG. 8 is a diagram illustrating a flow of current during charging of the high output battery ES-P using the recovered power from the motor generator MG. As illustrated in FIG. 8, during charging of the high output battery ES-P using recovered power generated by the motor generator MG, such as during deceleration of the electrically powered vehicle, the ECU 111 places the switch SWe in the OFF state, the switch SWp in the ON state, controls the PDU 103 such that the alternating current voltage obtained from the motor generator MG is converted into a direct current voltage, and controls the VCU 101 so as to step down the direct current voltage converted by the PDU 103. In this charging mode, due to being able to charge the high output battery ES-P using recovered power by passing through the VCU 101, the high output battery ES-P can also be charged during power recovery.

In a system including two batteries having different characteristics, such as the electrically powered vehicle of the present embodiment, energy management is performed based on the remaining capacity, i.e. the state of charge (SOC) of each of the batteries. Thus, the system stability is improved the greater the number of charging routes capable of adjusting the SOC of each of the batteries, and the advantages of such a system can be exploited. A summary of the charging routes utilizable in the present embodiment as illustrated in FIG. 3 to FIG. 8, and in FIG. 10 are the eight charging routes listed below.

1) Power interchange from the high capacity battery ES-E to the high output battery ES-P, as illustrated in FIG. 3
2) Power interchange from the high output battery ES-P to the high capacity battery ES-E, as illustrated in FIG. 3
3) Charging of the high output battery ES-P using the normal charger without going through the VCU 101, as illustrated in FIG. 4
4) Charging of the high capacity battery ES-E using the normal charger through the VCU 101, as illustrated in FIG. 5
5) Charging of the high capacity battery ES-E using the high speed charger 115 without going through the VCU 101, as illustrated in FIG. 6
6) Charging of the high output battery ES-P using the high speed charger 115 through the VCU 101, as illustrated in FIG.
7) Charging of the high capacity battery ES-E using the recovered power generated by the motor generator MG, as illustrated in FIG. 7
8) Charging of the high output battery ES-P using the recovered power generated by the motor generator MG, as illustrated in FIG. 8

The system stability is further improved due to there being four of the charging routes for the high capacity battery ES-E, and there being four of the charging routes for the high output battery ES-P, and not an uneven distribution between the charging opportunities for each of the batteries.

Note that in the power supply system described in Japanese Unexamined Patent Application Publication No. 2014-143817 as explained above, charging of the second battery 60 is performed using power from outside the vehicle by the charging device 450, and charging of the first battery 50 is performed using power supplied from the second battery 60, using part of the power from the charging device 450 charging the second battery 60, or by power through the converter 10 that is generated during power recovery, i.e. via the four charging routes listed below.

1) Charging of the second battery 60 using the charging device 450 without going through the converter 10
2) Charging of the first battery 50 using the charging device 450 through the converter 10
3) Charging of the first battery 50 using recovered power from the motor generators 3, 5
4) Charging of the first battery 50 using power interchange from the second battery 60 to the first battery 50

Moreover, there are three charging routes for the first battery 50, but there is only one charging route for the second battery 60. Thus the system stability is greatly inferior to that of the present embodiment.

The present application is not limited by the embodiment described above, and appropriate modifications, improvements, or the like may be made. For example, although the electrically powered vehicle in the above explanation is a single motor electric vehicle (EV), the electrically powered vehicle may be an EV installed with plural motor generators, a hybrid electric vehicle (HEV) installed with at least one motor generator and an internal combustion engine, or a fuel cell vehicle (FCV).

A first aspect of technology disclosed herein is a drive device including a first power storage unit (for example, the high output battery ES-P in an embodiment described below), a second power storage unit that is superior to the first power storage unit in energy to weight density, and inferior to the first power storage unit in output to weight density (for example, the high capacity battery ES-E in the embodiment described below), a voltage step-up section that steps up an output voltage of the first power storage unit (for example, the VCU 101 in the embodiment described below), an electric motor that is driven by power obtained from at least one out of the first power storage unit and the second power storage unit (for example, the motor generator MG in the embodiment described below), and an electrical unit that is connected between the first power storage unit and the voltage step-up section (for example, the electrical unit 113 in the embodiment described below). The voltage step-up section includes a switching element that opens or closes a current path between the first power storage unit, and either the electric motor or the second power storage unit (for example, the switching element Q1 in the embodiment described below), and a voltage of the second power storage unit is higher than a guaranteed operating voltage of the electrical unit.

A second aspect of technology disclosed herein may be the first aspect, wherein the switching element opens or closes a current path between the first power storage unit and the electric motor, the electrical unit has a higher withstand voltage than the guaranteed operating voltage, and a voltage arising from counter-electromotive force generated at maximum revolutions of the electric motor is higher than the withstand voltage.

A third aspect of technology disclosed herein may be the first or second aspect, further including a controller that controls charging of the first power storage unit or the second power storage unit (for example, the ECU 111 in the embodiment described below). A voltage of the second power storage unit is higher than a voltage of the first power storage unit, and the controller controls in a first mode in which power is interchanged between the first power storage unit and the second power storage unit.

A fourth aspect of technology disclosed herein may be the third aspect, wherein the controller controls to supply power from the first power storage unit to the second power storage unit through the voltage step-up section.

A fifth aspect of technology disclosed herein may be the any one of the first aspect to the fourth aspect, further including a controller that controls charging of the first power storage unit or the second power storage unit. The electrical unit includes a first charger connected to the first power storage unit and to the voltage step-up section (for example, the normal charger in the embodiment described below), and the controller controls in a second mode in which the first power storage unit is charged using power obtained from the first charger without going through the voltage step-up section.

A sixth aspect of technology disclosed herein may be the fifth aspect, wherein the controller controls in a third mode in which the second power storage unit is charged using power obtained from the first charger through the voltage step-up section.

A seventh aspect of technology disclosed herein may be any one of the first to sixth aspects, wherein the electrical unit includes a heat generating section that raises the temperature of the first power storage unit (for example, the heater in the embodiment described above).

An eighth aspect of technology disclosed herein may be any one of the first to seventh aspects, further including a controller that controls charging of the first power storage unit or the second power storage unit, and a second charger that is connected in parallel to the second power storage unit and is compatible with the voltage of the second power storage unit (for example, the high speed charger 115 in the embodiment described below). The controller controls in a fourth mode in which the second power storage unit is charged using power obtained from the second charger.

A ninth aspect of technology disclosed herein is a transporter including the drive device of any one of the first to eighth aspects.

According to the first aspect of technology disclosed herein and the ninth aspect of technology disclosed herein, the voltage of the second power storage unit is not applied to the electrical unit due to the switching element of the voltage step-up section opening the current path between the first power storage unit and the second power storage unit. This thereby enables the voltage of the second power storage unit to be set higher than the guaranteed operating voltage of the electrical unit. Namely, the voltage of the second power storage unit and the guaranteed operating voltage of the electrical unit can be set independently. Thus even when the second power storage unit is enlarged and the voltage of the second power storage unit becomes higher, there is no need to exchange the electrical unit for another electrical unit with a different guaranteed operating voltage. Since it is possible to exploit the advantages of a system provided with two power storage units having different characteristics, various vehicles having different performance demands may be applied with the drive device of technology disclosed herein. Moreover, due to excessive voltage withstanding capability not being required by the electrical unit, the cost of the electrical unit can be reduced, and a more compact and lighter weight electrical unit achieved.

According to the second aspect of technology disclosed herein, due to the voltage arising from counter-electromotive force generated at the maximum revolutions of the electric motor not being applied to the electrical unit due to the switching element of the voltage step-up section opening the current path between the first power storage unit and the electric motor, the withstand voltage of the electrical unit can be set lower than the voltage arising from counter-electromotive force generated at the maximum revolutions of the electric motor. Thus, due to being able to independently set the withstand voltage of the electrical unit and the voltage arising from counter-electromotive force generated by the electric motor, the degrees of freedom are increased when selecting the electric motor at the design stage of the drive device according to technology disclosed herein. Moreover, due to excessive withstand voltage performance not being required by the electrical unit, the cost of the electrical unit can be further reduced, and an even more compact and lighter weight electrical unit achieved.

According to the third of technology disclosed herein and the fourth aspect of technology disclosed herein, a charging route to interchange power between each of the power storage units can be secured, thereby enabling the remaining capacity of each of the power storage units to be adjusted.

According to the fifth aspect of technology disclosed herein, a charging route to charge the first power storage unit using the first charger without going through the voltage step-up section can be added, enabling the first power storage unit to be efficiently charged without energy loss in the voltage step-up section.

According to the sixth aspect of technology disclosed herein, a further charging route to charge the second power storage unit using the first charger through the voltage step-up section can be added, enabling the second power storage unit to be charged by power obtained from the first charger by going through the voltage step-up section. This thereby enables both the first power storage unit and the second power storage unit to be charged using the first charger.

According to the seventh aspect of technology disclosed herein, due to the heat generating section being connected between the first power storage unit and the voltage step-up section, the temperature of the first power storage unit can be raised without operating the voltage step-up section. Namely, the heat generating section can be driven efficiently.

According to the eighth aspect of technology disclosed herein, abundant mechanisms for adjusting the remaining capacity of each of the power storage units can be provided by charging the second power storage unit using the second charger, thus enabling the second power storage unit to be charged using power obtained from the second charger that is compatible with the voltage of the second power storage unit. This thereby enables the second power storage unit to be charged efficiently.

Obviously, numerous modifications and variations of the present invention are possible in light of the above teachings. It is therefore to be understood that within the scope of the appended claims, the invention may be practiced otherwise than as specifically described herein.

What is claimed is:

1. A drive apparatus comprising:
    a first power storage unit;
    a second power storage unit that is superior to the first power storage unit in energy to weight density, and inferior to the first power storage unit in output to weight density;
    a voltage step-up section that steps up an output voltage of the first power storage unit;
    an electric motor that is driven by power obtained from at least one out of the first power storage unit and the second power storage unit; and
    an electrical unit that is connected between the first power storage unit and the voltage step-up section, wherein
    the voltage step-up section includes a switching element that opens or closes a current path between the first power storage unit, and either the electric motor or the second power storage unit; and
    a voltage of the second power storage unit is higher than a guaranteed operating voltage of the electrical unit.

2. The drive apparatus according to claim 1, wherein:
    the switching element opens or closes a current path between the first power storage unit and the electric motor;
    the electrical unit has a higher withstand voltage than the guaranteed operating voltage; and
    a voltage arising from counter-electromotive force generated at maximum revolutions of the electric motor is higher than the withstand voltage.

3. The drive apparatus according to claim 1, further comprising:
    a controller that controls charging of the first power storage unit or the second power storage unit, wherein
    a voltage of the second power storage unit is higher than a voltage of the first power storage unit; and
    the controller controls in a first mode in which power is interchanged between the first power storage unit and the second power storage unit.

4. The drive apparatus according to claim 3, wherein:
    the controller controls to supply power from the first power storage unit to the second power storage unit through the voltage step-up section.

5. The drive apparatus according to claim 1, further comprising:
    a controller that controls charging of the first power storage unit or the second power storage unit, wherein
    the electric device includes a first charger connected to the first power storage unit and to the voltage step-up section; and
    the controller controls in a second mode in which the first power storage unit is charged using power obtained from the first charger without going through the voltage step-up section.

6. The drive apparatus according to claim 5, wherein the controller controls in a third mode in which the second power storage unit is charged using power obtained from the first charger through the voltage step-up section.

7. The drive apparatus according to claim 1, wherein:
    the electric device includes a heat generating section that raises the temperature of the first power storage unit.

8. The drive apparatus according to claim 1, further comprising:
    a controller that controls charging of the first power storage unit or the second power storage unit; and
    a second charger that is connected in parallel to the second power storage unit and is compatible with the voltage of the second power storage unit,
    wherein
        the controller controls in a fourth mode in which the second power storage unit is charged using power obtained from the second charger.

9. A transporter comprising the drive apparatus according to claim 1.

10. The drive apparatus according to claim 1, wherein:
    the switching element is configured to open or close a current path between the first power storage unit and the electric motor.

11. A drive apparatus comprising:
    a first power storage;
    a second power storage which is superior to the first power storage in energy to weight density and which is inferior to the first power storage in output to weight density;
    an electric motor to be driven with power supplied from at least one of the first power storage and the second power storage;
    a voltage booster to boost a voltage output from the first power storage, the voltage booster including a switch to electrically connect or disconnect the first power storage to at least one of the electric motor and the second power storage; and
    an electric device provided between the first power storage and the voltage booster, a voltage output from the second power storage being higher than a guaranteed operating voltage of the electric device.

12. The drive apparatus according to claim 11, wherein:
    the switching element electrically connects or disconnects the first power storage to the electric motor;
    the electric device has a higher withstand voltage than the guaranteed operating voltage; and
    a voltage that is counter-electromotive force to be generated at maximum revolution speed of the electric motor is higher than the withstand voltage.

13. The drive apparatus according to claim 11, further comprising:
    a controller to control charging of the first power storage or the second power storage, wherein
    a voltage output from the second power storage is higher than a voltage output form the first power storage; and the controller controls in a first mode in which power is interchanged between the first power storage and the second power storage.

14. The drive apparatus according to claim 13, wherein:
the controller controls to supply power from the first power storage to the second power storage through the voltage booster.

15. The drive apparatus according to claim 11, further comprising:
a controller to control charging of the first power storage or the second power storage, wherein
the electric device includes a first charger connected to the first power storage and to the voltage booster; and
the controller controls in a second mode in which the first power storage is charged using power supplied from the first charger without being boosted through the voltage booster.

16. The drive apparatus according to claim 15, wherein the controller controls in a third mode in which the second power storage is charged using power supplied from the first charger through the voltage booster.

17. The drive apparatus according to claim 11, wherein: the electric device includes a heater to raise the temperature of the first power storage.

18. The drive apparatus according to claim 11, further comprising:
a controller to control charging of the first power storage and the second power storage; and
a second charger connected in parallel to the second power storage and being compatible with the voltage of the second power storage, wherein
the controller controls in a fourth mode in which the second power storage is charged using power supplied from the second charger.

19. A transporter comprising the drive apparatus according to claim 11.

20. The drive apparatus according to claim 11, wherein:
the switching element is configured to electrically connect or disconnect the first power storage to the electric motor.

21. A drive apparatus comprising:
a first power storage unit;
a second power storage unit that has a higher energy to weight density than the first power storage unit, and a lower output to weight density than the first power storage unit;
a voltage step-up section configured to step up an output voltage of the first power storage unit;
an electric motor configured to be driven by power obtained from at least one out of the first power storage unit and the second power storage unit; and
an electrical unit that is connected between the first power storage unit and the voltage step-up section, wherein
the voltage step-up section includes a switching element configured to open or close a current path between the first power storage unit, and either the electric motor or the second power storage unit; and
a voltage of the second power storage unit is higher than a guaranteed operating voltage of the electrical unit.

* * * * *